United States Patent
Minteer et al.

(10) Patent No.: US 9,390,306 B2
(45) Date of Patent: Jul. 12, 2016

(54) FINGER BIOMETRIC SENSOR INCLUDING CIRCUITRY FOR ACQUIRING FINGER BIOMETRIC DATA BASED UPON FINGER STABILITY AND RELATED METHODS

(71) Applicant: APPLE INC., Cupertino, CA (US)

(72) Inventors: Gregory T. Minteer, Indian Harbour Beach, FL (US); Eric P. Kraemer, Melbourne, FL (US); Zhiqiang Gu, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 215 days.

(21) Appl. No.: 14/020,398

(22) Filed: Sep. 6, 2013

(65) Prior Publication Data
US 2015/0070137 A1 Mar. 12, 2015

(51) Int. Cl.
*G06F 7/04* (2006.01)
*G06K 9/00* (2006.01)
*G06K 9/20* (2006.01)

(52) U.S. Cl.
CPC ........ *G06K 9/00013* (2013.01); *G06K 9/00919* (2013.01); *G06K 9/209* (2013.01)

(58) Field of Classification Search
USPC ........................................................ 340/5.83
See application file for complete search history.

(56) References Cited

U.S. PATENT DOCUMENTS

| | | | | |
|---|---|---|---|---|
| 5,940,526 | A * | 8/1999 | Setlak | G06K 9/0002 382/124 |
| 5,963,679 | A | 10/1999 | Setlak | |
| 5,978,495 | A * | 11/1999 | Thomopoulos | G06K 9/00013 382/116 |
| 6,445,811 | B1 * | 9/2002 | Wada | G06K 9/00013 382/124 |
| 6,501,846 | B1 * | 12/2002 | Dickinson | G06F 3/021 345/156 |
| 2006/0093191 | A1 * | 5/2006 | Neil | G06F 1/32 382/124 |
| 2006/0170658 | A1 * | 8/2006 | Nakamura | G06F 3/0412 345/173 |
| 2007/0076924 | A1 * | 4/2007 | Fujii | G06K 9/00013 382/124 |
| 2008/0205714 | A1 * | 8/2008 | Benkley | G06F 3/03547 382/126 |
| 2009/0279742 | A1 * | 11/2009 | Abiko | G06K 9/00026 382/107 |
| 2010/0045432 | A1 * | 2/2010 | Abe | G06K 9/00114 340/5.83 |
| 2010/0220900 | A1 * | 9/2010 | Orsley | G06F 3/0421 382/124 |
| 2012/0250949 | A1 * | 10/2012 | Abiko | G06T 1/00 382/115 |
| 2012/0269406 | A1 * | 10/2012 | Kraemer | G06K 9/00013 382/124 |
| 2013/0002725 | A1 * | 1/2013 | Kim | G06F 9/4445 345/684 |
| 2013/0076485 | A1 * | 3/2013 | Mullins | G06F 21/32 340/5.83 |
| 2013/0082945 | A1 * | 4/2013 | Jo | H04M 1/67 345/173 |
| 2013/0231046 | A1 * | 9/2013 | Pope | G06K 9/00013 455/41.1 |
| 2014/0270413 | A1 * | 9/2014 | Slaby | G06F 3/0488 382/124 |
| 2014/0270414 | A1 * | 9/2014 | Slaby | G06K 9/00013 382/124 |

* cited by examiner

*Primary Examiner* — Naomi Small
(74) *Attorney, Agent, or Firm* — Allen, Dyer, Doppelt, Milbrath & Gilchrist, P.A.

(57) ABSTRACT

A finger biometric sensor may include an array of finger biometric sensing pixels and processing circuitry coupled to the array of finger biometric sensing pixels. The processing circuitry may be capable of acquiring finger stability biometric data from a subset of the array, and determining whether a finger is stable relative to the array of finger biometric sensing pixels based upon the finger stability biometric data. The processing circuitry may also be capable of acquiring finger biometric data from the array of finger biometric sensing pixels when the finger is stable.

35 Claims, 7 Drawing Sheets

FINGER BIOMETRIC SENSOR INCLUDING CIRCUITRY FOR ACQUIRING FINGER BIOMETRIC DATA BASED UPON FINGER STABILITY AND RELATED METHODS

FIELD OF THE INVENTION

The present invention relates to the field of electronics, and, more particularly, to electronic devices including finger biometric sensors and related methods.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A particularly advantageous approach to fingerprint sensing is disclosed in U.S. Pat. No. 5,963,679 to Setlak and assigned to the assignee of the present invention. The fingerprint sensor is an integrated circuit sensor that drives the user's finger with an electric field signal and senses the electric field with an array of electric field sensing pixels on the integrated circuit substrate. Such sensors are used to control access for many different types of electronic devices such as computers, cell phones, personal digital assistants (PDA's), and the like. In particular, fingerprint sensors are used because they may have a small footprint, are relatively easy for a user to use and they provide reasonable authentication capabilities.

One type of finger biometric sensor is a touch-based finger biometric sensor. A touch-based finger biometric sensor may fail or take a relatively long time to acquire data if the finger is not stationary or stable during finger biometric data acquisition.

SUMMARY

A finger biometric sensor may include an array of finger biometric sensing pixels and processing circuitry coupled to the array of finger biometric sensing pixels. The processing circuitry may be capable of acquiring finger stability biometric data from a subset of the array of finger biometric sensing pixels, and determining whether a finger is stable relative to the array of finger biometric sensing pixels based upon the finger stability biometric data. The processing circuitry may also be capable of acquiring finger biometric data from the array of finger biometric sensing pixels when the finger is stable. Accordingly, the finger biometric sensor acquires finger biometric data when the finger is stable or not moving with respect to array of finger biometric sensing pixels. Thus, for example, acquisition times may be decreased and more accurate finger biometric data may be acquired since the acquisition may be performed a reduced number of times, and when the finger is not in motion.

The processing circuitry may be capable of determining whether the finger is adjacent the array of finger biometric sensing pixels prior to acquiring the finger stability biometric data. The processing circuitry may be capable of determining whether the finger is adjacent the array of finger biometric sensing pixels based upon a change in an oscillation frequency associated with the array of finger biometric sensing pixels, for example. In other words, frequency based finger detection may be initially used to wake up the circuitry.

The subset of the array of finger biometric sensing pixels may include a plurality of spaced apart sub-arrays of finger biometric sensing pixels. The plurality of spaced apart sub-arrays may be arranged in a checkerboard pattern, for example.

The processing circuitry may be capable of determining whether the finger is stable based upon whether a threshold number of sub-arrays is sensing the finger. The processing circuitry may be capable of determining whether the finger is stable further based upon whether the threshold number of sub-arrays indicates stability over successive data acquisitions, for example.

The array of finger biometric sensing pixels may include an array of electric field finger sensing pixels. The finger biometric sensor may further include a finger coupling electrode adjacent the array of finger biometric sensing pixels. The processing circuitry may further include drive circuitry coupled to the finger coupling electrode.

An electronic device aspect may include a housing and wireless communications circuitry carried by the housing. The finger biometric sensor may also be carried by the housing. The electronic device may include an input device carried by the housing. The finger biometric sensor may be carried by the input device. The input device may include a pushbutton switch, for example.

A method aspect is directed to a method of acquiring finger biometric data. The method may include acquiring finger stability biometric data from a subset of an array of finger biometric pixels and determining whether a finger is stable relative to the array of finger biometric sensing pixels based upon the finger stability biometric data. The method may also include acquiring the finger biometric data from the array of finger biometric sensing pixels when the finger is stable.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
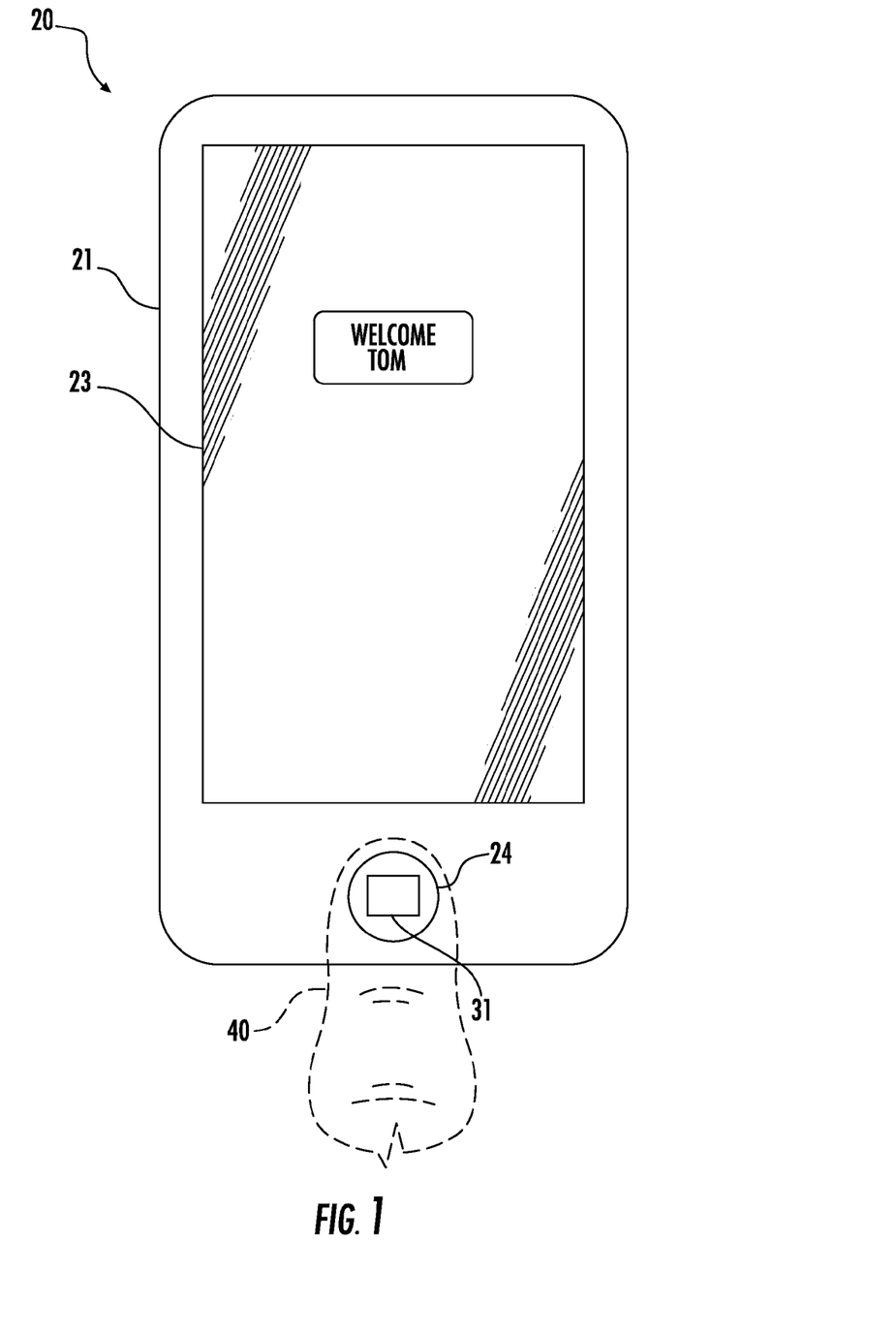
FIG. 1 is a plan view of an electronic device according to an embodiment.
Figure 2:
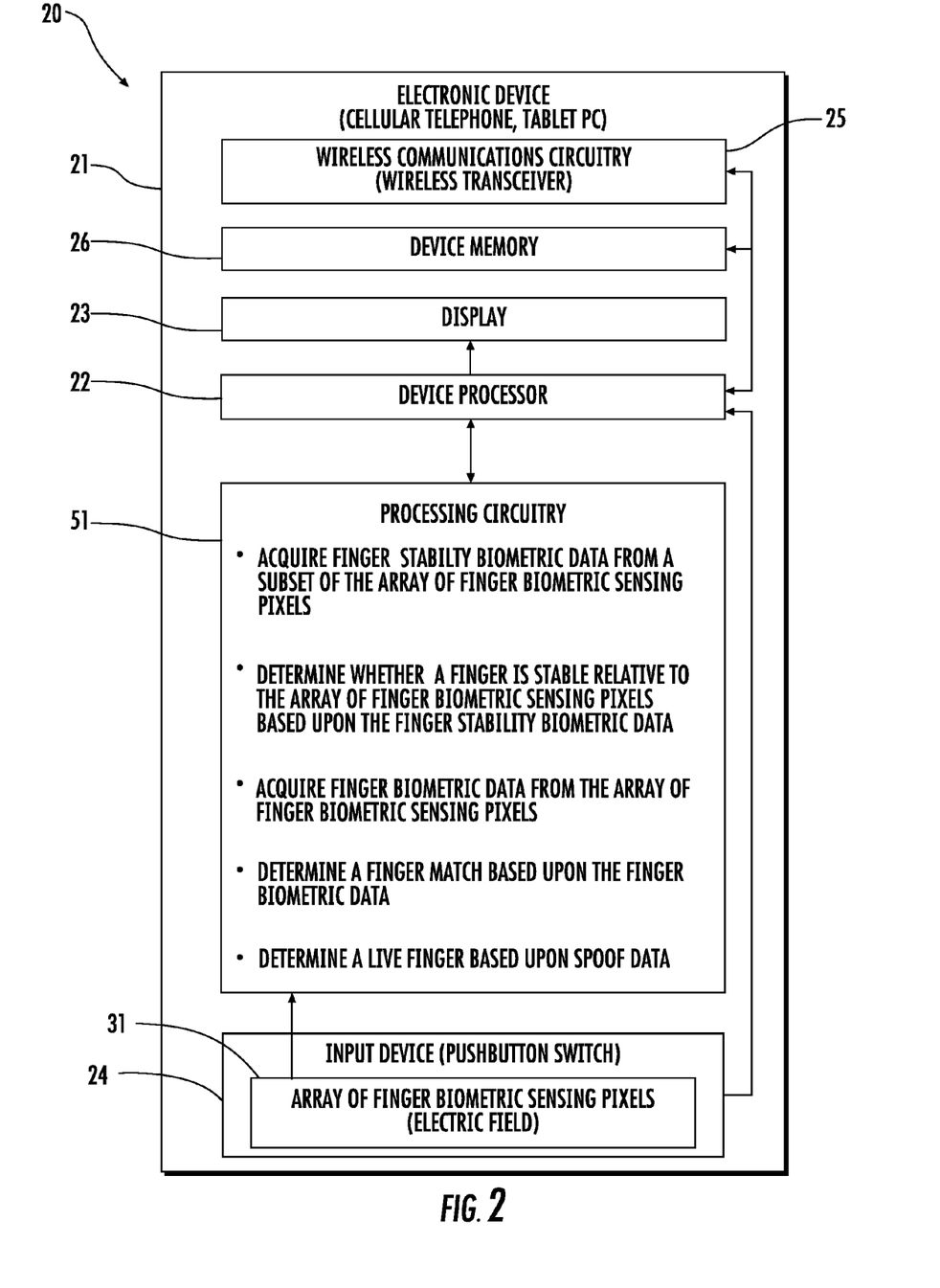
FIG. 2 is a schematic block diagram of the electronic device of FIG. 1.

Referring initially to FIGS. 1-2, an electronic device 20 is now described. The electronic device 20 illustratively includes a portable housing 21 and a device processor 22 carried by the portable housing. The electronic device 20 is illustratively a mobile wireless communications device, for example, a cellular telephone. The electronic device 20 may be another type of electronic device, for example, a tablet computer, laptop computer, etc.

Wireless communications circuitry 25 (e.g. a wireless transceiver, cellular, WLAN Bluetooth, etc.) is also carried within the housing 21 and coupled to the device processor 22. The wireless transceiver 25 cooperates with the device processor 22 to perform at least one wireless communications function, for example, for voice and/or data. In some embodiments, the electronic device 20 may not include a wireless transceiver 25.

A display 23 is also carried by the portable housing 21 and is coupled to the device processor 22. The display 23 may be a liquid crystal display (LCD), for example, or may be another type of display, as will be appreciated by those skilled in the art. A device memory 26 is also coupled to the processor 22.

A finger-operated user input device, illustratively in the form of a pushbutton switch 24, is also carried by the portable housing 21 and is coupled to the device processor 22. The pushbutton switch 24 cooperates with the device processor 22 to perform a device function in response to the pushbutton switch. For example, a device function may include a powering on or off of the electronic device 20, initiating communication via the wireless communications circuitry 25, and/or performing a menu function.

More particularly, with respect to a menu function, the device processor 22 may change the display 23 to show a menu of available applications based upon pressing of the pushbutton switch 24. In other words, the pushbutton switch 24 may be a home switch or button, or key. Of course, other device functions may be performed based upon the pushbutton switch 24. In some embodiments, the finger-operated user input device 24 may be a different type of finger-operated user input device, for example, forming part of a touch screen display. Other or additional finger-operated user input devices may be carried by the portable housing 21.

The electronic device 20 includes a finger biometric sensor 50, which may be in the form of one or more integrated circuits (ICs). The finger biometric sensor 50 includes an array of finger biometric sensing pixels 31 that may be part of an IC carried by the pushbutton switch 24 to sense a user's finger 40 or an object placed adjacent the array of electric field sensing pixels. Each pixel of the array of finger biometric sensing pixels 31 may be an electric field sensing pixel of the type as disclosed in U.S. Pat. No. 5,940,526 to Setlak et al., for example, assigned to the present assignee, and the entire contents of which are herein incorporated by reference.

The finger biometric sensor 50 includes processing circuitry 51 which may be in the form of one or more processors and a memory coupled thereto. Other circuitry may be included in the processing circuitry 51, as will be described in further detail below.

Figure 3:
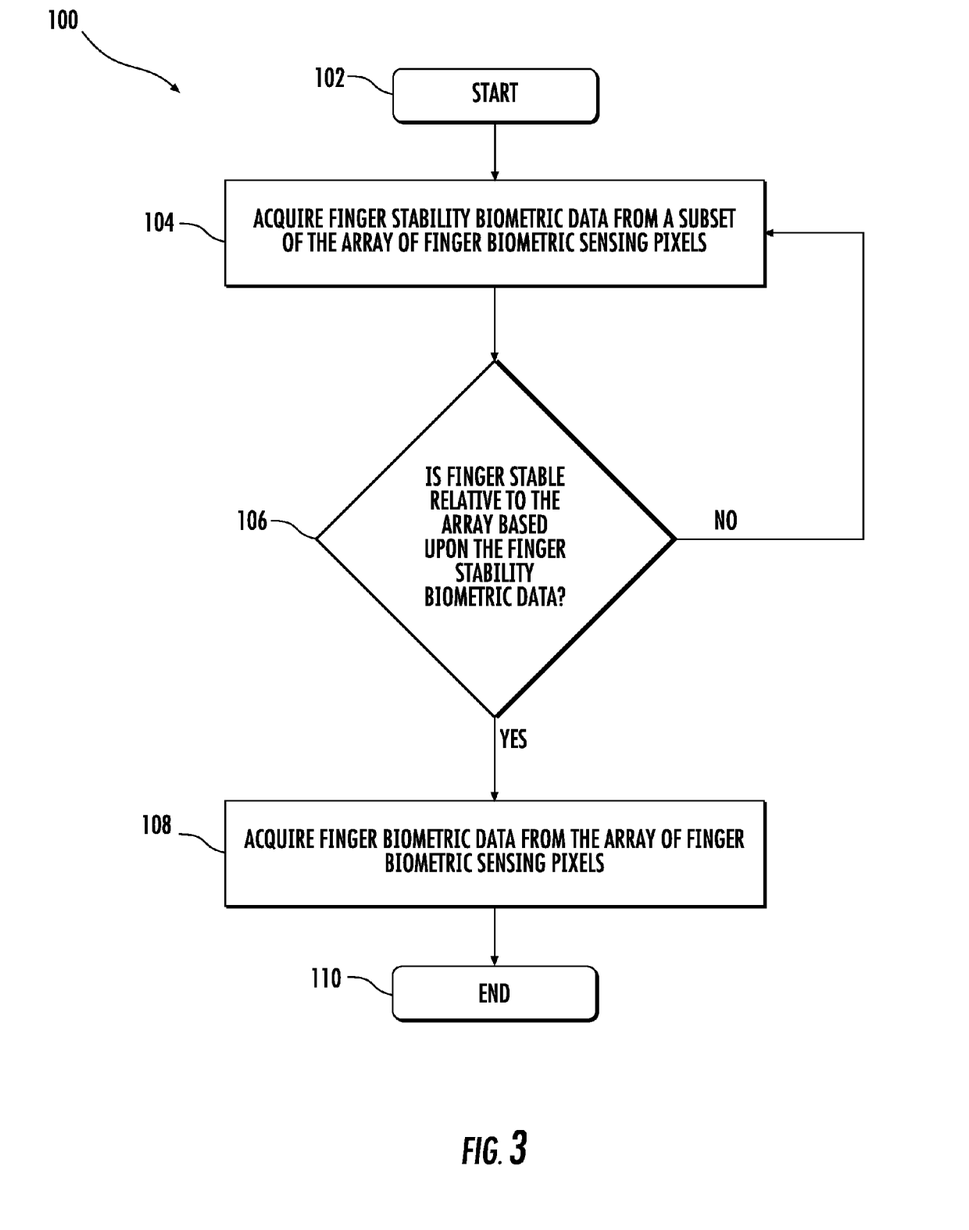
FIG. 3 is a flowchart of acquisition of finger biometric data from the finger sensor of FIG. 2.

Referring now to the flowchart 100 in FIG. 3, beginning at Block 102, acquisition of finger biometric data from the finger biometric sensor 50 is now described. The processing circuitry 51, at Block 104 acquires finger stability biometric data from a subset of the array of finger biometric sensing pixels 31.

The processing circuitry 51 determines whether a finger is stable relative to the array of finger biometric sensing pixels 31 based upon the finger stability biometric data (Block 106).

If the finger is stable, the processing circuitry 51 acquires finger biometric data from the array of finger biometric sensing pixels 31 at Block 108 before ending at Block 110. If the finger is not stable, the processing circuitry will again acquire finger stability biometric data (Block 104) and make a determination of whether the finger is stable (Block 106).

In some embodiments, the processing circuitry 51, for example, may also cooperate with the array of finger biometric sensing pixels 31 to determine a finger match based upon the image data. More particularly, the processing circuitry 51 may determine a finger match based upon enrollment image data stored in memory and the sufficient amount of generated image data. Enrollment data may typically be collected over a series of regions of a finger that are then assembled or composited into a larger region. The match or generated image data may be smaller, but still having a number of matching features to provide a desired rate of matching.

In some embodiments, the processing circuitry 51 may also determine a live finger based upon spoof data. More particularly, the processor 51 may determine a live finger based upon a complex impedance and/or bulk impedance measurement.

In some embodiments, the processing circuitry 51 may cooperate with the array finger biometric sensing pixels 31 to perform a navigation function, for example. Of course the processing circuitry 51 may cooperate with the array finger biometric sensing pixels 31 and/or other circuitry to perform other or additional functions, as will be appreciated by those skilled in the art.

It should be understood that in some embodiments, the processing circuitry 51 may be part of or included in the device processor 22. In other words, the functionality described herein with respect to the processing circuitry 51 may be performed by the device processor 22, another processor, or shared between or among processors.

Figure 4:
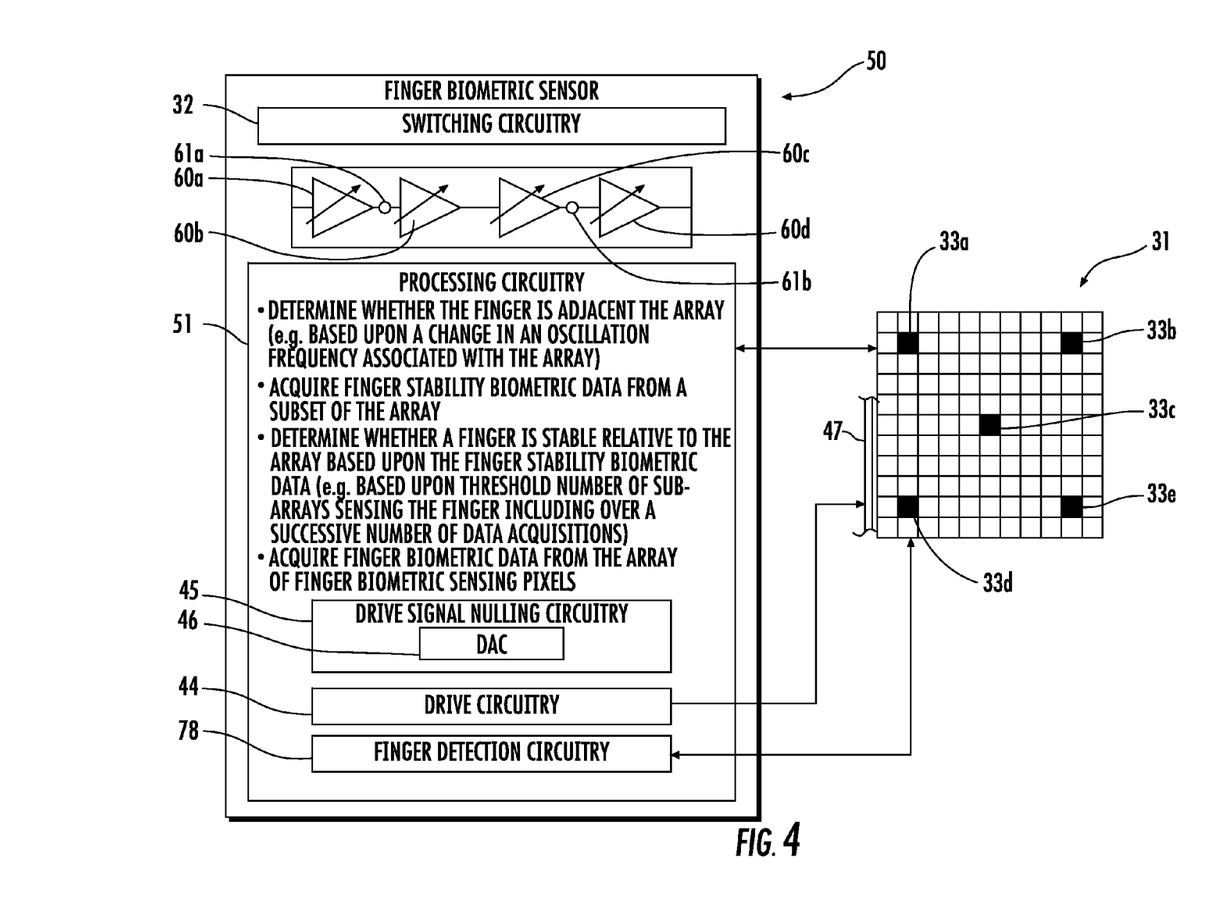
FIG. 4 is a schematic block diagram of a portion of finger biometric sensor according to another embodiment.
Figure 5:
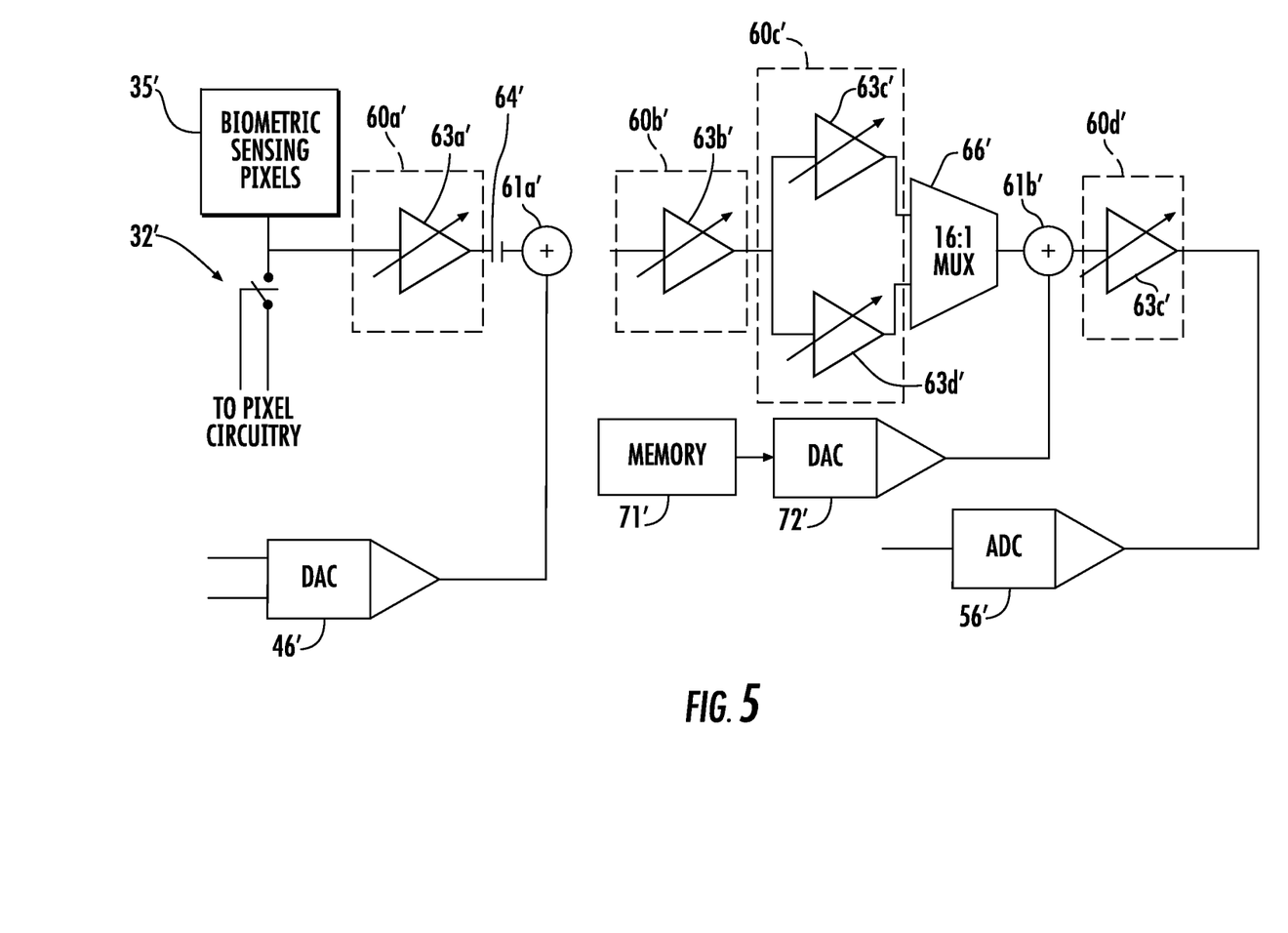
FIG. 5 is a more detailed schematic diagram of the portion of the finger biometric sensor of FIG. 4.

Referring now to FIGS. 4 and 5, further details of a finger biometric sensor 50' are described. The finger biometric sensor 50' also includes switching circuitry 32' coupled to the array of finger biometric sensing pixels 31' and gain stages 60a'-60d'. The switching circuitry 32' is capable of acquiring finger biometric data from each of a plurality of sub-arrays 33a'-33e' of the array of finger biometric sensing pixels 31'. More particularly, the switching circuitry 32' is capable of sequentially generating output data for adjacent regions of the array of finger biometric sensing pixels 31' or sub-arrays 33a'-33e', or more particularly, for each finger biometric sensing pixel 35'. In an 88×88 array of finger biometric sensing pixels, there are 7744 finger biometric sensing pixels and 7744 corresponding switches. Of course, additional switches may be used, as will be appreciated by those skilled in the art.

The finger biometric sensing device 50', and more particularly, the processing circuitry 51' includes drive circuitry 44' capable of generating a drive signal coupled to the array of finger biometric sensing pixels 31'. The array of finger biometric sensing pixels 31' cooperates with the drive circuitry 44' to generate a detected signal based upon placement of a finger 40' adjacent the array of finger biometric sensing pixels. The gain stages 60a'-60d' are coupled together in series and define summing nodes 61a'-61b' between a pair of adjacent ones of the gain stages.

The first gain stage 60a' may be in the form of one or more variable gain amplifiers 63a' defining front end amplifiers, each respectively coupled to a finger biometric sensing pixel from the array of finger biometric sensing pixels 31'. The first gain stage 60a' is input with the detected signal at a raw signal level. An output of the first gain stage 60a' is coupled to the first summing node 61a'. For an 8-channel implementation (e.g., for an 88×88 array of finger biometric sensing pixels divided into eleven 8×8 regions), there are 8 instances of the illustrated first gain stage 60a'.

The second gain stage 60b' may also be in the form of one or more variable gain amplifiers 63b' defining AC amplifiers. Each amplifier 63b' of the second gain stage 60b' has an input coupled to the first summing node 61a'. A capacitor 64' or other impedance device may be coupled between the first summing node 61a' and the first gain stage 60a'. The second gain stage 60b' also processes the input signal at a raw signal level. For an 8-channel implementation (e.g., for an 88×88 array of finger biometric sensing pixels divided into eleven 8×88 regions), there are 8 instances of the illustrated second gain stage 60b'.

The third gain stage 60c' may be in the form of one or more pairs of variable gain amplifiers 63c', 63d' defining a correlated double sampler (CDS). More particularly, the third gain stage 60c' may include odd and even variable gain amplifiers 63c', 63d' for each channel. For an 8-channel implementation, there are 8 instances of the illustrated third gain stage 60c'. The output of each of the odd and even variable gain amplifiers 63c', 63d' of the third gain stage 60c' are input to a multiplexer 66'. As will be appreciated by those skilled in the art, the multiplexer 66' may be a 16:1 multiplexer for an 8 channel implementation. The output of the multiplexer 66 is summed, at the second summing node 61b', with an output from a second digital-to-analog converter (DAC) 72', which will be described in further detail below. The third gain stage 60c' also processes the input signal at a raw signal level.

The fourth gain stage 60d' may also be in the form of one or more variable gain amplifiers 63e'. The variable gain amplifier 63e' may have an input coupled to the second summing node 61b' and an output coupled to the third summing node 61c'. The fourth gain stage 60d' processes the input signal at a feature signal level. Of course, while four gain stages 60a'-60d' are illustrated and described, there may be additional gain stages.

The finger biometric sensor 50' includes a finger coupling electrode 47' adjacent the array of finger biometric sensing pixels 31'. The drive circuitry 44' may be in form of a drive signal generator, or voltage generator, coupled to the finger coupling electrode 47'.

The array of finger biometric sensing pixels 31' and the gain stages 60a'-60d' have a circuit reference associated therewith. The circuit reference is to be coupled to a device ground so that the drive circuitry 44' drives the finger coupling electrode 47' with respect to the circuit reference and the device ground.

The finger biometric sensor 50' also includes drive signal nulling circuitry 45' coupled to the gain stages 60a'-60d'. As will be appreciated by those skilled in the art, relatively high voltage drive signals may result in relatively large common mode voltages appearing on the detected signal generated from the array of finger biometric sensing pixels 31'. Since the drive signal generally carries no useful information, it may be particularly desirable to reduce or eliminate it as early as possible in the signal chain. Specifically, small spatial variations in electric field intensity in the presence of a relatively large average field intensity may be measured.

The drive signal nulling circuitry 45' is capable of reducing the relatively large drive signal component from the detected signal. The drive signal nulling circuitry 45' includes digital-to-analog converter (DAC) 46' capable of generating an inverted scaled replica of the drive signal for the gain stages 60a'-60d'. More particularly, the DAC 46' is coupled to the first summing node 61a'. A memory may be coupled to the DAC 46'.

An output analog-to-digital converter (ADC) 56' may be coupled downstream from the gain stages 60a'-60d'. More particularly, the output ADC 56' may be coupled to the fourth gain stage 60d' and may have a dynamic range. In some embodiments, a memory may be coupled to the ADC 56'. Control circuitry is capable of adjusting the fourth gain stage 60d', and in some embodiments, other and/or additional gain stages so that an output thereof is within the dynamic range of output ADC 57'.

Figure 6:
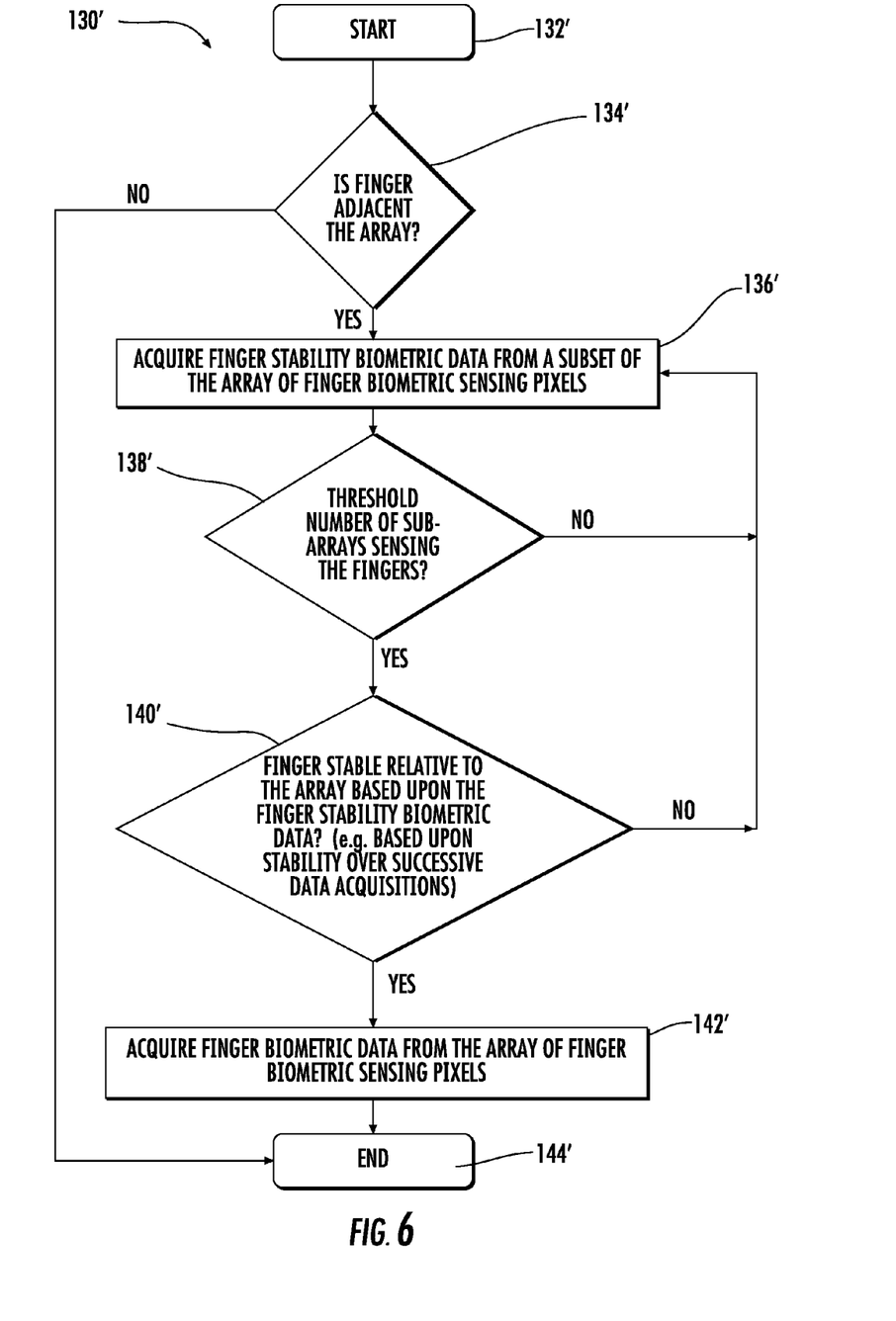
FIG. 6 is a flowchart of acquisition of finger biometric data from the finger sensors of FIG. 4.

Referring now additionally to the flowchart 130' in FIG. 6, beginning at Block 132', further details of the finger biometric sensor 50' and acquisition of finger biometric data from the finger biometric sensor are now described. At Block 134', the processing circuitry 51' determines whether the finger 40' is adjacent the array of finger biometric sensing pixels 31'. This determination is made prior to acquiring finger stability biometric data, as will be described in further detail below.

The processing circuitry 51' includes finger detection circuitry 78' that determines whether the finger 40' is adjacent the array of finger biometric sensing pixels 31' based upon a change in an oscillation frequency associated with the array of finger biometric sensing pixels 31'. In particular, a finger is determined to be adjacent when the finger contacts the coupling electrode 47' and the array of finger biometric sensing pixels 31'. Contact (or close proximity) with the coupling electrode 47' is determined based upon frequency-based finger detection (FBFD). A frequency-based finger detection is a relatively low-power detection technique that is performed with the analog circuits powered off and the main clock of the finger biometric sensor 50' shut off. Finger contact with the coupling electrode 47' and the array of finger biometric sensing pixels 31' is verified by the acquiring data from the pixels of the array of finger biometric sensing pixels.

Figure 7:
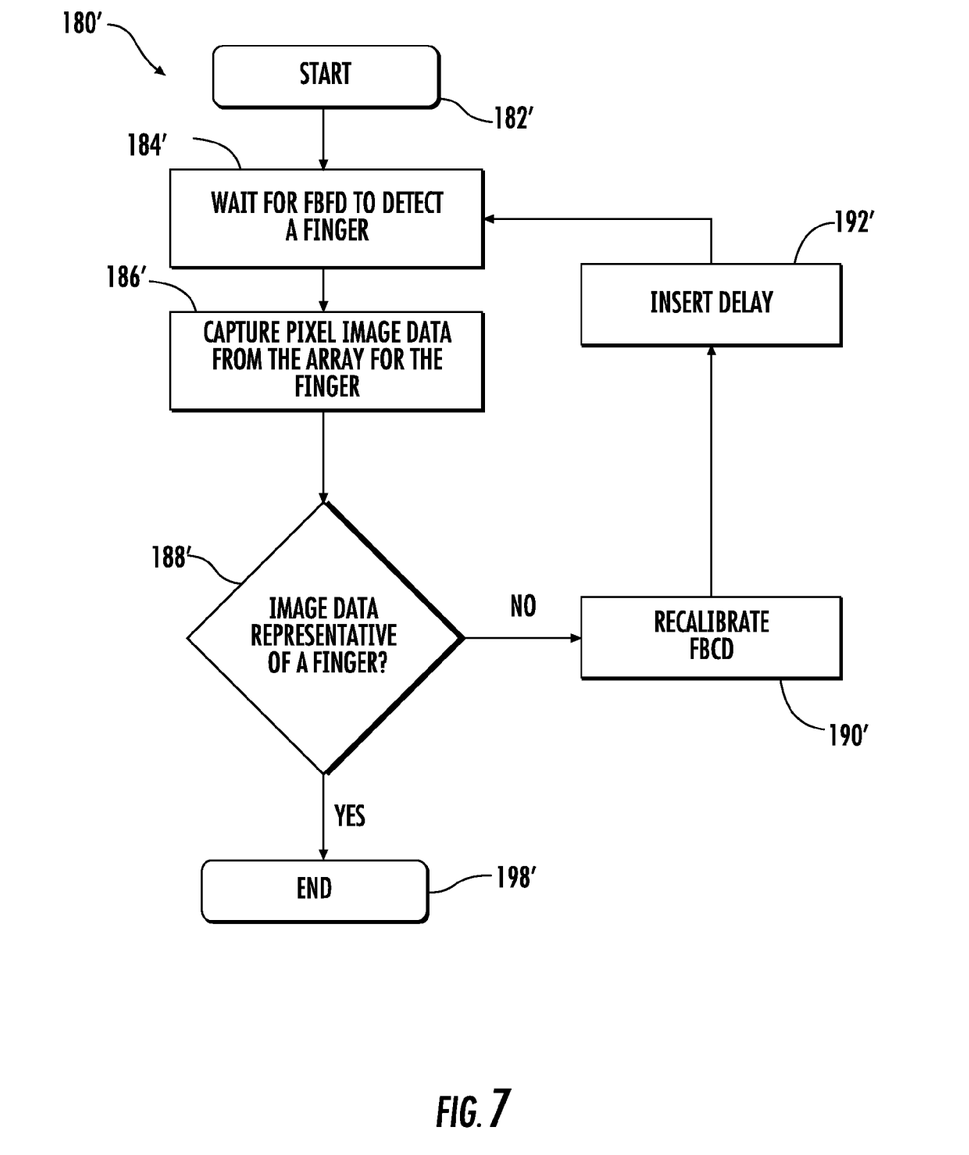
FIG. 7 is a detailed flowchart of the process of determining whether a finger is adjacent the array illustrated in the flowchart of FIG. 6.

Referring now briefly to the flowchart 180' in FIG. 7 further details of the finger detection technique noted above with respect to Block 134' are described. Beginning at Block 182', at Block 184', the processing circuitry 51', and more particularly, the finger detection circuitry 78' waits for the frequency-based finger detection to detect a finger. At Block 186', the pixel image data from the array of finger biometric sensing pixels 31' is captured for the finger. If the pixel image data is representative of a finger (Block 188'), a finger has been detected, and the process ends at Block 198'. If the pixel image data is not representative of a finger, the finger-based frequency detection is recalibrated (Block 190') and a delay is inserted (Block 192') before returning to Block 184'. Of course, in some embodiments other finger detection techniques may be used.

Returning to the flowchart 130' in FIG. 6, after the finger is detected, checks for stability and motion, for example, are performed by the processing circuitry 51' to ensure that the finger is stable before beginning an image capture or acquisition of finger biometric data. The processing circuitry 51', at Block 136', acquires finger stability biometric data from a subset of the array of finger biometric sensing pixels 31'. As illustrated in FIG. 4, the subset of the array of finger biometric sensing pixels 30' includes spaced apart sub-arrays 33a'-33e' from five regions of finger biometric sensing pixels and arranged in a checkerboard pattern. Each sub-array 33a'-33e' may include an 8×8 arrangement of pixels. In some embodiments, the subset may include sub-arrays configured or arranged in other patterns and from other regions. Moreover, while five sub-arrays from five regions of finger biometric finger sensing pixels are illustrated, the subset may include any number of sub-arrays and regions.

In the illustrated embodiment, the processing circuitry 51' acquires finger stability data from each of the sub-arrays to determine whether there is a finger in the region. A region may be considered to include sub-arrays from a given column of the array of finger biometric sensing pixels 31'. Of course, in other embodiments, a region may be defined by, for example, a row of sub-arrays.

The processing circuitry 51' determines, at Block 138', whether a threshold number of sub-arrays is sensing the finger. More particularly, the processing circuitry 51' determines whether sub-arrays from at least three regions (of the five) have acquired finger stability data indicative of a finger. A setting of the DAC 46' may be indicative of whether a finger is in a given region. If less than three regions have acquired finger stability data indicative of a finger, then the processing circuitry 51' again acquires finger stability biometric data from the subset of the array of finger biometric sensing pixels 31' (Block 136'). The threshold number of sub-arrays may be any number, and, for example, may be based upon the total number of sub-arrays.

Once the processing circuitry 51' has determined that a threshold number of sub-arrays is sensing a finger, the processing circuitry determines whether a finger is stable relative to the array of finger biometric sensing pixels 31' based upon the finger stability biometric data (Block 140'). More particularly, the processing circuitry 51' determines whether the finger is stable based upon whether the threshold number of sub-arrays indicates stability over successive data acquisitions. A determination of stability may be made when a difference between a last setting and current setting of the DAC 46' are either less than a first threshold or greater than a second threshold that is greater than the first threshold. A determination of stability may also be made based upon a difference between the difference between the last setting and the current setting of the DAC 46', and the last setting being less than a threshold, for example, 0 (i.e, (current–last)–(last–previousTolast)<threshold, or (N–(N–1))–((N–1)–(N–2)), etc., where N is a current setting, N–1 is the last setting, N–2 is the setting previous to the last setting, and so on).

The processing circuitry 51' may detect motion by generating a sum of the absolute value of pixel differences, as will be appreciated by those skilled in the art. The pixel values used may be 8-bit pixel values after a digital zoom. Other pixel values types may be used. The sum of the pixel difference is compared to yet another threshold, for example, a 16-bit programmable threshold. The sum of the pixel differences is to be less than or equal to the programmable threshold for the finger to be considered not moving, stationary, or stable, If the finger is determined to be stable (Block 140'), the processing circuitry 51' acquires finger biometric data from the array of finger biometric sensing pixels 31' (Block 142' before ending at Block 144'. If the finger is not stable, the processing circuitry 51' will again acquire finger stability biometric data from a subset (Block 136'), determine whether a threshold number of sub-arrays is sensing the finger (Block 138') and make a determination of whether the finger is stable (Block 140').

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A finger biometric sensor comprising:
an array of finger biometric sensing pixels;
a digital-to-analog converter (DAC) having a previous setting value and a current setting value associated therewith; and
processing circuitry coupled to the array of finger biometric sensing pixels and the DAC, and configured to
acquire finger stability biometric data from a subset of the array of finger biometric sensing pixels based upon a static placement of a user's finger adjacent the array of finger biometric sensing pixels, the finger stability biometric data comprising the previous and current setting values of the DAC,
determine whether a finger is stable relative to the array of finger biometric sensing pixels based upon a difference between the previous and current setting values of the DAC, and
acquire finger biometric data from the array of finger biometric sensing pixels when the finger is stable.

2. The finger biometric sensor of claim 1, wherein the processing circuitry is configured to determine whether the finger is adjacent the array of finger biometric sensing pixels prior to acquiring the finger stability biometric data.

3. The finger biometric sensor of claim 2, wherein the processing circuitry is configured to determine whether the finger is adjacent the array of finger biometric sensing pixels based upon a change in an oscillation frequency associated with the array of finger biometric sensing pixels.

4. The finger biometric sensor of claim 1, wherein the subset of the array of finger biometric sensing pixels comprises a plurality of spaced apart sub-arrays of finger biometric sensing pixels.

5. The finger biometric sensor of claim 4, wherein the plurality of spaced apart sub-arrays are arranged in a checkerboard pattern.

6. The finger biometric sensor of claim 4, wherein the processing circuitry is configured to determine whether the finger is stable based upon whether a threshold number of sub-arrays is sensing the finger.

7. The finger biometric sensor of claim 6, wherein the processing circuitry is configured to determine whether the finger is stable further based upon whether the threshold number of sub-arrays indicates stability over successive data acquisitions.

8. The finger biometric sensor of claim 1, wherein the array of finger biometric sensing pixels comprises an array of electric field finger sensing pixels.

9. The finger biometric sensor of claim 1, further comprising a finger coupling electrode adjacent the array of finger biometric sensing pixels; and wherein the processing circuitry further comprises drive circuitry coupled to the finger coupling electrode.

10. An electronic device comprising:
a housing;
wireless communications circuitry carried by the housing;
a finger biometric sensor carried by the housing and comprising
an array of finger biometric sensing pixels;
a digital-to-analog converter (DAC) having a previous setting value and a current setting value associated therewith; and
processing circuitry coupled to the array of finger biometric sensing pixels and the DAC, and configured to
acquire finger stability biometric data from a subset of the array of finger biometric sensing pixels based upon a static placement of a user's finger adjacent the array of finger biometric sensing pixels, the finger stability biometric data comprising the previous and current setting values of the DAC, determine whether a finger is stable relative to the array of finger biometric sensing pixels based upon a difference between the previous and current setting values of the DAC, and acquire finger biometric data from the array of finger biometric sensing pixels when the finger is stable.

11. The electronic device of claim 10, further comprising an input device carried by the housing; and wherein the finger biometric sensor is carried by the input device.

12. The electronic device of claim 11, wherein the input device comprises a pushbutton switch.

13. The electronic device of claim 10, wherein the processing circuitry is configured to determine whether the finger is adjacent the array of finger biometric sensing pixels prior to acquiring the finger stability biometric data.

14. The electronic device of claim 13, wherein the processing circuitry is configured to determine whether the finger is adjacent the array of finger biometric sensing pixels based upon a change in an oscillation frequency associated with the array of finger biometric sensing pixels.

15. The electronic device of claim 10, wherein the subset of the array of finger biometric sensing pixels comprises a plurality of spaced apart sub-arrays of finger biometric sensing pixels.

16. The electronic device of claim 15, wherein the processing circuitry is configured to determine whether the finger is stable based upon whether a threshold number of sub-arrays is sensing the finger.

17. The electronic device of claim 16, wherein the processing circuitry is configured to determine whether the finger is stable further based upon whether the threshold number of sub-arrays indicates stability over successive data acquisitions.

18. The electronic device of claim 10, further comprising a finger coupling electrode adjacent the array of finger biometric sensing pixels; and wherein the processing circuitry further comprises drive circuitry coupled to the finger coupling electrode.

19. A method of acquiring finger biometric data comprising:

acquiring finger stability biometric data from a subset of an array of finger biometric pixels, the finger stability biometric data comprising previous and current setting values of a DAC;

determining whether a finger is stable relative to the array of finger biometric sensing pixels based upon a difference between the previous and current setting values of the DAC based upon a static placement of a user's finger adjacent the array of finger biometric sensing pixels; and acquiring the finger biometric data from the array of finger biometric sensing pixels when the finger is stable.

20. The method of claim 19, further comprising determining whether the finger is adjacent the array of finger biometric sensing pixels prior to acquiring the finger stability biometric data.

21. The method of claim 20, wherein determining whether the finger is adjacent the array of finger biometric sensing pixels comprises determining whether the finger is adjacent the array of finger biometric sensing pixels based upon a change in an oscillation frequency associated with the array of finger biometric sensing pixels.

22. The method of claim 21, wherein the subset of the array of finger biometric sensing pixels comprises a plurality of spaced apart sub-arrays of finger biometric sensing pixels.

23. The method of claim 22, wherein determining whether the finger is stable comprises determining whether the finger is stable based upon whether a threshold number of sub-arrays is sensing the finger.

24. The method of claim 23, wherein determining whether the finger is stable comprises determining whether the finger is stable further based upon whether the threshold number of sub-arrays indicates stability over successive data acquisitions.

25. A finger biometric sensor comprising:

an array of finger biometric sensing pixels, each finger biometric sensing pixel having a pixel value associated therewith; and processing circuitry coupled to the array of finger biometric sensing pixels and configured to acquire finger stability biometric data from a subset of the array of finger biometric sensing pixels based upon a static placement of a user's finger adjacent the array of finger biometric sensing pixels, the finger stability biometric data comprising the pixel values for each finger biometric sensing pixel, determine whether a finger is stable relative to the array of finger biometric sensing pixels based upon differences in the pixel values, and acquire finger biometric data from the array of finger biometric sensing pixels when the finger is stable.

26. The finger biometric sensor of claim 25, wherein the processing circuitry is configured to determine whether the finger is adjacent the array of finger biometric sensing pixels prior to acquiring the finger stability biometric data.

27. The finger biometric sensor of claim 26, wherein the processing circuitry is configured to determine whether the finger is adjacent the array of finger biometric sensing pixels based upon a change in an oscillation frequency associated with the array of finger biometric sensing pixels.

28. The finger biometric sensor of claim 25, wherein the subset of the array of finger biometric sensing pixels comprises a plurality of spaced apart sub-arrays of finger biometric sensing pixels.

29. The finger biometric sensor of claim 28, wherein the plurality of spaced apart sub-arrays are arranged in a checkerboard pattern.

30. The finger biometric sensor of claim 28, wherein the processing circuitry is configured to determine whether the finger is stable based upon whether a threshold number of sub-arrays is sensing the finger.

31. A method of acquiring finger biometric data comprising:

acquiring finger stability biometric data from a subset of an array of finger biometric pixels, the finger stability biometric data comprising pixel values for each finger biometric sensing pixel;

determining whether a finger is stable relative to the array of finger biometric sensing pixels based upon differences in pixel values based upon a static placement of a user's finger adjacent the array of finger biometric sensing pixels; and acquiring the finger biometric data from the array of finger biometric sensing pixels when the finger is stable.

32. The method of claim 31, further comprising determining whether the finger is adjacent the array of finger biometric sensing pixels prior to acquiring the finger stability biometric data.

33. The method of claim 32, wherein determining whether the finger is adjacent the array of finger biometric sensing pixels comprises determining whether the finger is adjacent the array of finger biometric sensing pixels based upon a change in an oscillation frequency associated with the array of finger biometric sensing pixels.

34. The method of claim 33, wherein the subset of the array of finger biometric sensing pixels comprises a plurality of spaced apart sub-arrays of finger biometric sensing pixels.

35. The method of claim 34, wherein determining whether the finger is stable comprises determining whether the finger is stable based upon whether a threshold number of sub-arrays is sensing the finger.

* * * * *